United States Patent [19]
Marceau et al.

[11] Patent Number: 5,969,569
[45] Date of Patent: Oct. 19, 1999

[54] PROCESS FOR CONTROLLING AT LEAST ONE IGBT TYPE TRANSISTOR ENABLING ITS OPERATION UNDER IRRADIATION

[75] Inventors: Michel Marceau, Montfort l'Amaury; Guillaume Cogat, Fontenay-Aux-Roses, both of France

[73] Assignees: Commissariat a l'Energie Atomique, Paris; Compagnie Generale Des Matieres Nucleaires, Velizy Villacoublay, both of France

[21] Appl. No.: 09/095,584

[22] Filed: Jun. 11, 1998

[30] Foreign Application Priority Data

Jun. 11, 1997 [FR] France ................... 97 07238

[51] Int. Cl.⁶ ................... H02M 7/162
[52] U.S. Cl. ................... 327/574; 327/588
[58] Field of Search ................... 327/419, 574, 327/588

[56] References Cited

U.S. PATENT DOCUMENTS 5,801,936  9/1998  Mori et al. ................... 363/132

OTHER PUBLICATIONS

M. Marceau, Intelligent Motion Proceedings, pp. 507 to 517, "Vulcan: An Hardened Amplifier for DC Motor", 1996.

Primary Examiner—Timothy P. Callahan
Assistant Examiner—Jeffrey Zweizig
Attorney, Agent, or Firm—Oblon, Spivak, McClelland, Maier & Neustadt, P.C.

[57] ABSTRACT

This invention relates to a process for controlling at least one IGBT type transistor enabling its operation under irradiation, in which the value of the threshold value $Vge_s$ of the gate-emitter voltage of a first IGBT transistor (30) under irradiation is measured, and the voltage applied between the gate and the emitter of at least one second IGBT transistor under irradiation is varied during operation, so as to slave the threshold voltage $Vge_s$ of this (these) IGBT transistor(s) to a set value despite the drift caused by irradiation.

6 Claims, 9 Drawing Sheets

PROCESS FOR CONTROLLING AT LEAST ONE IGBT TYPE TRANSISTOR ENABLING ITS OPERATION UNDER IRRADIATION

DESCRIPTION

Technical Domain

This invention relates to a process controlling at least one IGBT type transistor enabling its operation under irradiation.

1. State of Prior Art

In the past, hardening of components and systems was applicable mainly to the spatial and military domains. Extension of this technique to the civil nuclear domain characterized by high doses of γ radiation, has become inescapable for active robots, for example for control of remote manipulators in reprocessing plants.

DC motors are usually used for making actuators, due to the simplicity of their control. Recently, in order to save space and maintenance, it has been preferred to use self-controlled "Brushless" synchronous motors. In this case it becomes more difficult to harden the variator for these motors, which is more complex.

In order to be able to control a "Brushless" motor, or any other type of AC motor, power supplies of between 400 and 1000 volts are necessary which requires the use of IGBTs (Insulated Gate Bipolar Transistor).

Two strategies are possible to deal with this type of hardening problem:

Hardened components originating from military industries can be used. However, these industries only offer expensive components only capable of withstanding relatively low accumulated doses compared with accumulated doses necessary for civil nuclear equipment. Secondly, at the present time there is no IGBT transistor available in a hardened version. Finally, it may be thought that hardened component industries may disappear in the more or less long term, as a result of the general decrease in all military budgets.

It would be possible to use only components made in large commercially available production series, and take account of or even control any drifts that occur in them. This is called system hardening. This strategy requires knowledge about the behavior of each component under irradiation.

The process according to the invention makes use of the second strategy, since it is the only way of achieving the required resistance to accumulated doses.

There are very few existing solutions that use this system hardening strategy, and they are not widely distributed:

The first solution described in "Handbook of Radiation Effects" by A. Holmer-Stedle, L. Adams, Oxford Science Publications uses bipolar transistors (possibly but not necessarily power transistors). Several studies of the behavior of bipolar transistors have demonstrated the fact that the value of the gain β of the bipolar transistor will drop significantly, depending on the integrated radiation dose. Consequently, one possible solution would be to use the transistor always considering that it is operating at a maximum gain that characterizes it after a known integrated dose used as a reference.

A second solution described in "Vulcain: An Hardened Amplifier for D.C. Motor" by M. Marceau, PCIM 96, uses N-MOS power transistors. Various studies carried out on the behavior of N-MOS transistors under γ radiation have demonstrated the drift in the threshold voltage Vgs towards negative voltages depending on the integrated dose before reaching a negative asymptote. Therefore, a second system hardening solution consists of controlling switching of the N-MOS transistor using two voltages: a positive voltage to make it completely conducting, and a negative voltage to block it regardless of the drift in its threshold voltage Vgs.

Therefore, a system hardening solution is necessary for each transistor type. Furthermore, the precise behavior of the transistor considered has to be known for each series made by each semi-conductor manufacturer, even if the major trends of drifts in the characteristics concerned can be predicted.

At the present time, there is no system hardening solution available for IGBT transistors.

The purpose of the invention is a control process for making a power circuit based on IGBT transistors, which is capable of resisting an accumulated dose exceeding 10 Mrad (100 Kgy).

DESCRIPTION OF THE INVENTION

This invention proposes a process for controlling at least one IGBT type transistor enabling operation of the transistor under irradiation, characterized in that the threshold value $Vge_s$ of the gate-emitter voltage of the first IGBT transistor is measured under irradiation, and the voltage applied between the gate and the emitter of at least one second IGBT transistor under irradiation is varied such that the threshold voltage $Vge_s$ of this or these second IGBT transistor(s) is slaved to a set value despite the drift caused by the irradiation.

In this advantageous embodiment, the slaving signal is measured on a test IGBT transistor.

In the case of a three-phase voltage variator in a bridge, at least one of the two power supply sources (positive and negative respectively) applied between the gate and the emitter of the second IGBT transistor, or one of the second IGBT transistors, is modulated. Advantageously, the second IGBT transistor(s) is (are) subject to double switching; conventional blocked-unblocked switching and amplitude switching of the threshold voltage Vge applied between the gate and emitter to implement slaving according to the invention.

In one advantageous embodiment, the amplitude of the positive voltage Vp applied between the gate and the emitter is switched depending on the comparison between the value of the threshold voltage $Vge_s$ of the first transistor and a reference −X, as follows where α is a determined voltage value:

if $Vge_s > -X$ then $Vp=+2\alpha$ if $Vge_s < -X$ then $Vp=+\alpha$ which gives a controlled asymptote of its threshold voltage $Vge_s$. For example, α could be 5 volts.

The process according to the invention has several advantages:

- it can make power stages with resistance to very high irradiation doses (>100 kGy), since the drift is compensated. It can be used to design hardened electronic assemblies without the power part being the controlling element for the received dose;
- it can improve efficiency (which is very important for power electronics) compared with the use of simple high value symmetric power supplies. When the positive power supply switches from +2α to +α, the energy loss necessary to control the transistor is divided by two;
- it is applicable to all IGBT transistors on the market, regardless of their manufacturer, provided that a few prior tests are carried out;

it can optimize the overall circuit considered, since –X is known in advance.

The process according to the invention is applicable to all types of actuators operating in a nuclear environment, and particularly:

in power amplifiers for "Brushless" motors for the robotics using IGBT transistors as power switches;

in three-phase power bridges for all AC motors (asynchronous, etc.);

in power supplies using IGBT transistors.

DETAILED DESCRIPTION OF EMBODIMENTS

BEHAVIOR OF THE IGBT TRANSISTOR UNDER γ RADIATION

Since the most frequently used model for IGBT transistors is the N channel transistor or N-IGBT (the P-IGBT transistor operates in the same way as the N-IGBT transistor), we will simply characterize the transistor N-IGBT transistor as an example, and will refer to it as the "IGBT transistor" in the rest of this description.

Figure 1:
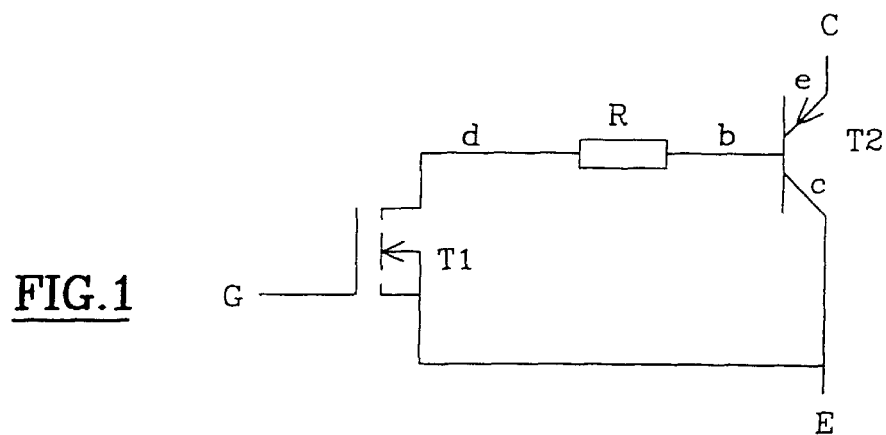
FIG. 1 illustrates the equivalent circuit of an IGBT transistor.

FIG. 1 illustrates an equivalent circuit for an IGBT transistor, which is characterized by a MOS input transistor (transistor T1) and a bipolar PNP output transistor (transistor T2). The state (conducting or non-conducting) of the PNP output transistor T2 is initialized by controlling the gate of the MOS transistor T1. When the gate is polarized to be positive (i.e. Vge>0), an electric field is created through the insulation under the gate. This electric field enables inversion of P doping to N doping under the insulation layer. There is then an N channel through which current can pass (since electrons are the majority carriers) between the drain and source of the MOS transistor through an N channel. The consequence of a current of majority electrons from the MOS transistor drain-source current (transistor T1) is a current of minority positive carriers ("holes") in the opposite direction. This is how the base of the PNP transistor (transistor T2) is powered, then enabling the passage of a current of mostly positive carriers or "holes" (accompanied by a current of minority electron carriers in the opposite direction) directly from emitter E to collector C of the IGBT transistor, or from collector C to emitter E of the PNP bipolar output transistor. The addition of these two currents with different majority carriers taking separate "paths" enables the passage of a power current.

It is commonly assumed that the integrated dose affects MOS technologies mainly by two trapping phenomena. The first traps holes in oxides, and the second results in their migration to the Si—SiO2 interface. The consequence is a negative drift in the threshold voltages of MOS transistors. The variation in the threshold voltage is the result of several phenomena, which have effects that may oppose each other and work at different rates depending on the temperature and the polarization.

In the case of bipolar components, it is generally accepted that the main parameter affected by the integrated dose is the transistor current gain (h21). This may drop spectacularly on Darlington type components. It is usually possible to compensate for this loss by taking it into account in the system design. This is often the case for integrated bipolar circuits.

It was necessary to characterize IGBT transistors under Gamma radiation; the technical problem cannot be solved by a simple design based on the equivalent diagram and on the behaviors of MOS and two-pole transistors under radiation.

Figure 2:
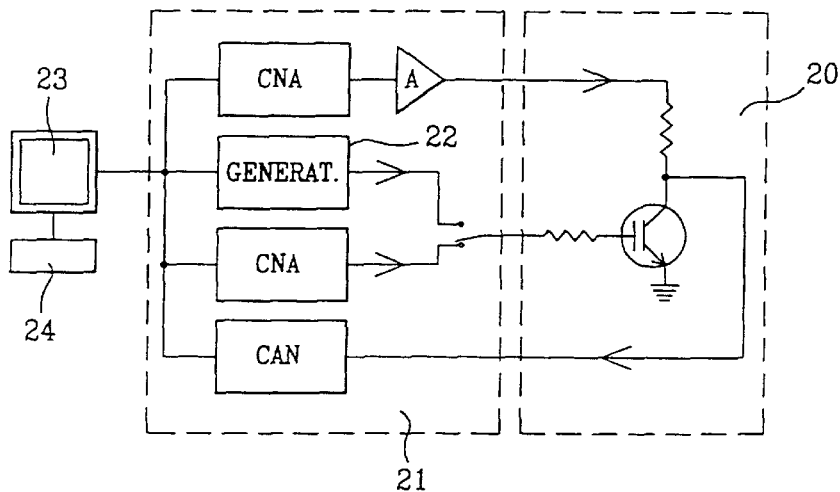
FIG. 2 illustrates a block diagram of the test bench used.

In order to measure the variation in the threshold voltage $Vge_s$ of components under irradiation, tests were carried out in an irradiator with the measurement system being moved outside. As shown in FIG. 2, a special test board 20 keeps the transistors at a constant distance from the source. An analog multiplexer 21 of type AMUX64T (National Instrument) is used to select channels and do an analog to digital data conversion (ADC), and to supply test signals. A square signal generator 22 with frequency 12 kHz and voltage ±15 volts is used to power the transistors between measurements. A computer 23 with special software controls all measurements and saves the results on hard disk 24. The measurements are made every 20 minutes. Transistors switch between each measurement, under the control of generator 12. The tests are carried out at a current of 100 mA. For this current, the value of the corresponding voltage Vge is determined by successive approximations. The dose rate is fixed at 100 Gy/H, so that the accumulated dose of 10 kGy can be exceeded at the end of one week.

Figure 3:
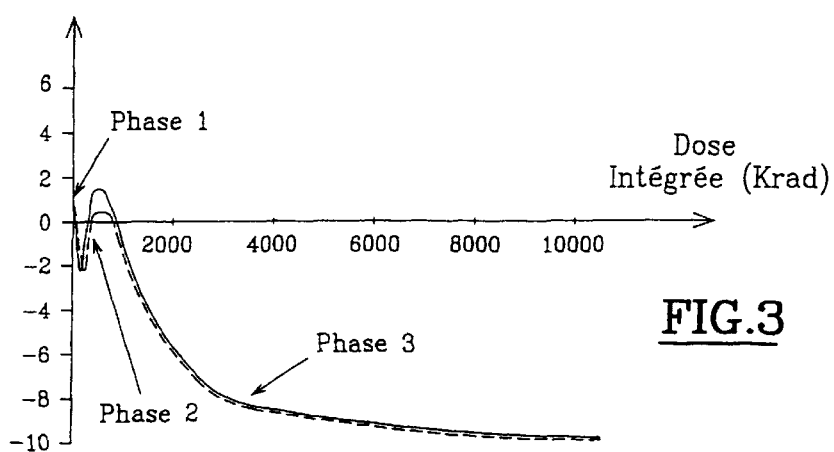
FIG. 3 illustrates the effect of the accumulated dose on an IGBT transistor.

The graph in FIG. 3 shows the variation in the drift of the threshold voltage $Vge_s$ for almost all IGBT transistors tested. This graph is broken down into three distinctive phases. Phase 2 and phase 3 may appear more or less early with respect to the absorbed dose depending on the type of IGBT transistor concerned. Similarly, the amplitude of the three phases depends on the type of IGBT transistor tested.

Phase 1

As for an N channel MOS power transistor, at the beginning of irradiation most charges are trapped in the insulation, particularly holes that remain in an area close to the area in which they are trapped, trapped electrons being quickly removed. Therefore, there is a surplus of positive charges in the insulation between the gate and the channel area. The applied voltage Vge is lower than before, in order to block the IGBT transistor. The threshold voltage $Vge_s$ then drifts downwards towards negative voltages.

Phase 2

Starting from a given irradiation dose, trapping of charges may be compensated and then exceeded by other counteracting effects as follows:

The first effect, or the interface effect, comes from the MOS part of the IGBT transistor. New interface states in which negative charges partly compensate the trapped positive charges appear at the interface between the insulation and the doped semi-conductors.

The second effect originates from the bipolar part (PNP) of the IGBT transistor. As for the MOS transistor, the gain β is degraded due to the appearance of new interface states between the insulation and the doped semi-conductors. These new interface states accelerate the rate at which minority charge carriers recombine and finally reduce the gain. This drop in the gain is primarily due to ionization of the oxide at the interfaces covering the base-emitter region of the PNP transistor.

The third effect, which also originates from the PNP bipolar transistor, is characterized by an increase in leakage currents in the PNP transistor. Leakage currents at interfaces increase in the same way as the gain deteriorates. This increase in leakage currents at interfaces with the insulation takes place primarily in the insulation region covering the collector-base junction of the PNP transistor, in other words at the same locations as the damage and the new interface states occur in the MOS part. This increase in leakage currents facilitates blockage of the IGBT transistor, and increases the threshold voltage $Vge_s$.

The threshold voltage $Vge_s$ rises due to the addition of these three effects, facilitating blocking of the IGBT transistor within a range of absorbed doses. However, the second and third effects quickly reach saturation states. Consequently, the increase in the threshold voltage $Vge_s$ is limited.

Phase 3

Following the saturation states of the second and third effects concerning the bipolar part (PNP), the charge trapping effect becomes predominant again. The threshold voltage $Vge_s$ drifts once again towards increasingly negative voltages. New interface states are still formed as a result of this charge trapping. Finally, these two effects reach saturation states and a final stabilization of the threshold voltage $Vge_s$ may occur.

Figure 4:
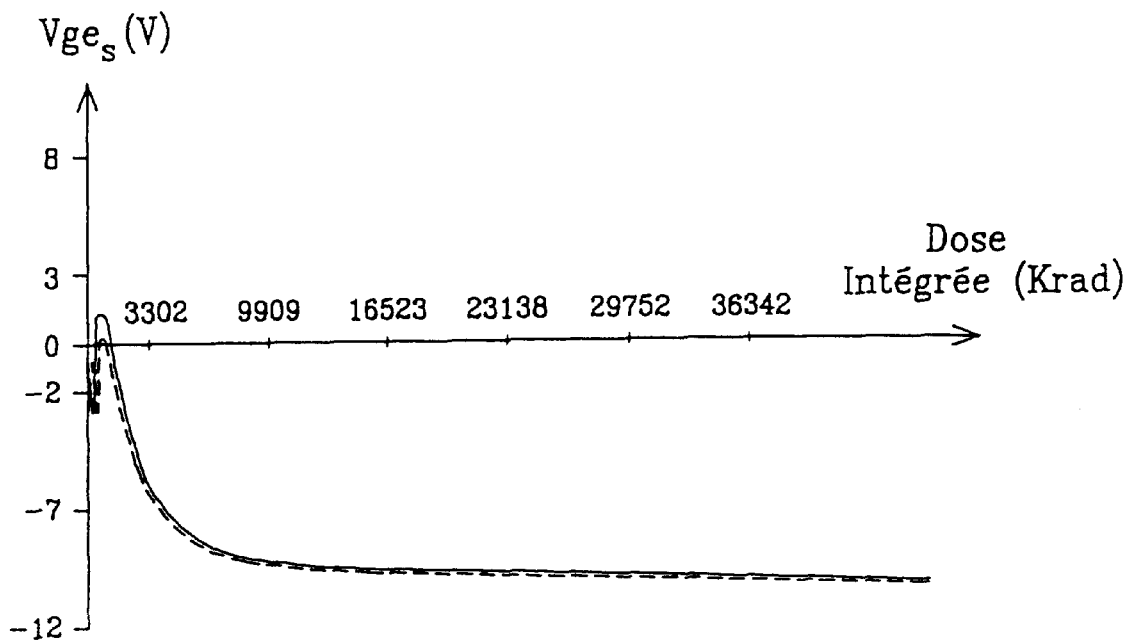
FIG. 4 illustrates the behavior of an IGBT transistor under a strong dose.

FIG. 4 illustrates the behavior of an IGBT transistor under a high irradiation dose (dose rate 100 krads/H; Vge=+15/−15 V for F=12 kHz; IC=100 mA) and shows that the asymptotic phenomenon observed at $10^4$ Gy is confirmed up to $4.10^5$ Gy, but that a negative voltage of the order of −11 volts has to be provided to be sure of blocking the transistor.

Figure 5:
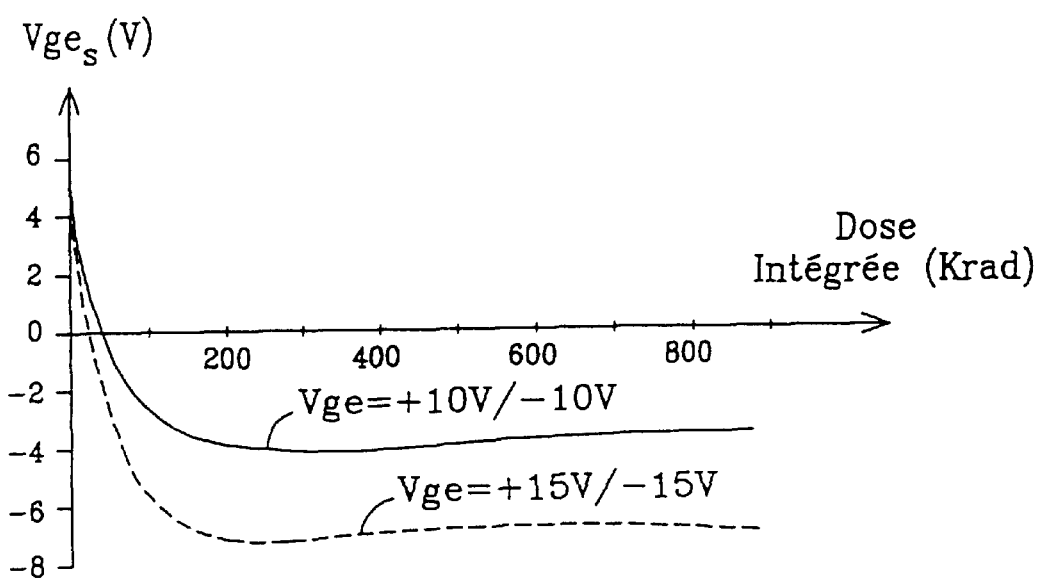
FIG. 5 illustrates the influence of polarization on operation of an IGBT transistor.

The graph in FIG. 5 (dose rate=12 krads/H; f=12 kHz) shows the importance of the amplitude of the positive polarization. The behavior of a transistor polarized with a voltage of +15 volts and +10 volts is observed, the horizontal asymptote moving towards the abscissas when the voltage reduces. Therefore, it is necessary to optimize this positive voltage as a function of the application and to control its level.

Figure 6:
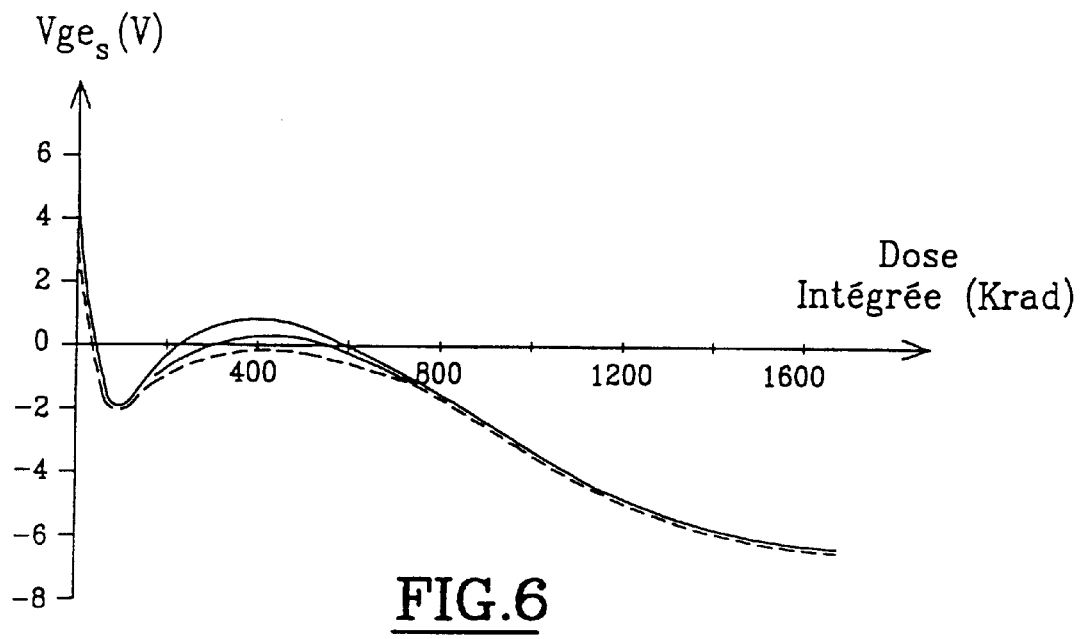
FIG. 6 illustrates dispersion of the results on a batch of IGBT transistors.

The graph in FIG. 6 (dose rate=12 krad/H; Vge=15/−15 V for f=12 kHz; IC=100 mA) shows the dispersion of results in the same batch of components. In order to be able to use these transistors, it is essential to observe homogenous behavior of components in the same batch. In general, the resistance to radiation depends very much on the component manufacturing process. If the process varies considerably between batches, then the characterizations must be repeated. Similarly, two components with the same reference but made by two different manufacturers must be considered separately.

It would appear that even if several characteristics of IGBT transistors are affected by irradiation, the main characteristic to be controlled is the blocking voltage of these transistors, or the threshold voltage, $Vge_s$.

POSSIBLE HARDENING SOLUTIONS

Several solutions could be considered to solve the problem of hardening an IGBT transistor:

One solution described in the article "Vulcain: A Hardened Amplifier for D.C. Motor" mentioned above, has two power supplies (positive and negative) with accumulated amplitudes exceeding the extremes of the drift of the transistor blocking voltage. This solution has the advantage of simplicity. However, it is not conducive to maximum efficiency.

The invention consists of measuring the variation in the drift of the threshold voltage $Vge_s$ using an IGBT transistor, and consequently monitoring the amplitude of the two gate power supplies (Vp for its positive voltage; Vn for its negative voltage). The main advantage of this solution is that it respects the general efficiency of the motor control. Furthermore, this solution can compensate for regeneration of the component.

The invention also consists of measuring the threshold value $Vge_s$ of the gate-emitter voltage of a first IGBT transistor under irradiation, and varying the voltage applied during operation between the gate and the emitter of at least one second IGBT transistor under irradiation, so as to slave the threshold voltage $Vge_s$ for this (these) IGBT transistor(s) to a set value despite the drift caused by the irradiation. The first transistor may be a test IGBT transistor. At least one of the two power supply sources can be modeled, namely the positive Vp and negative Vn sources applied between the gate and emitter of the second IGBT transistor(s).

Faced with requirements about reliability and ease of implementation, in one specific embodiment of the invention the Vp and Vn power supply monitoring system is simplified by considering a system for switching the Vp power supply only with respect to a reference −X of the drift in the threshold voltage $Vge_s$. This simplification is designed to be a more "logical" solution than the initial purely analog solution. The change in the drift of the threshold voltage can make the circuit simpler and more reliable, since an analog circuit is more sensitive to an irradiation dose than a circuit composed of logical gates (provided that the technology used is well selected). The invention slaves the drift of the threshold voltage $Vge_s$ to the chosen reference voltage. The choice of this reference (−X) is then a system optimization parameter.

POSITIVE POWER SUPPLY SWITCHING PRINCIPLE

Development of the switching principle according to the invention was guided by two aspects of control over an IGBT transistor, namely:

The influence of positive polarization. As already described, with respect to FIG. 5, the tendency of the threshold voltage $Vge_s$ to drift towards negative voltages reduces as the IGBT transistor gate polarization reduces.

The general efficiency of the circuit. The power consumed to control the transistor is different depending on the values of the applied voltages.

Figure 7:
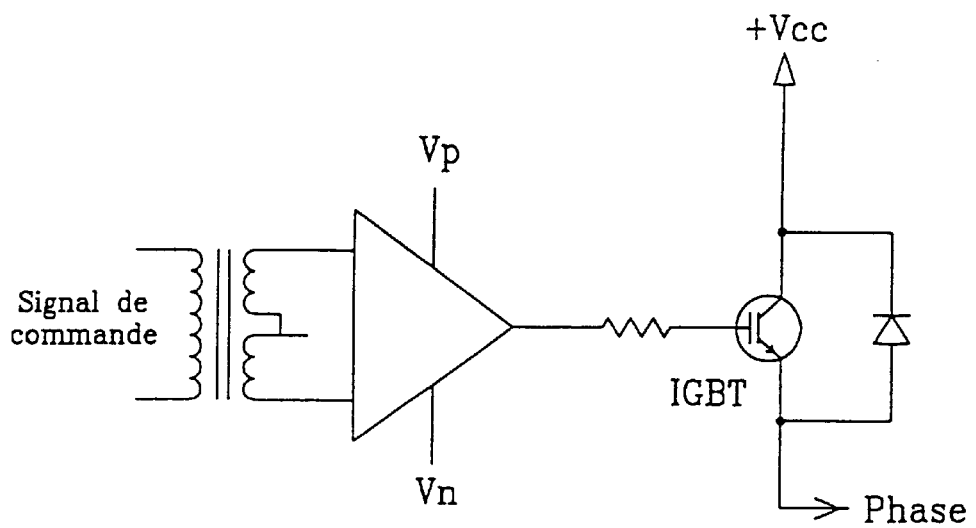
FIG. 7 illustrates the basic control circuit for an IGBT transistor in a power bridge.

A basic control circuit for an IGBT transistor in a power bridge, illustrated on FIG. 7, demonstrates the action of the two voltages Vp and Vn that fix the switching voltage levels initiated by the control signal. In one advantageous embodiment, the invention hardens the IGBT transistor using only the Vp voltage.

In the process according to the invention, the drift of the threshold voltage $Vge_s$, or the blocking voltage for a given minimum current, is then slaved by adjusting the value of the positive voltage Vp applied to the IGBT transistor gate, making it conducting during operation in switching mode. The value of this voltage Vp is then adjusted to a value that varies depending on the change in the value of the voltage $Vge_s$, as a function of the cumulative dose of γ radiation. This slaving is done starting from the measurement of the voltage $Vge_s$, for example on a test IGBT transistor that controls and therefore slaves the drifts in the threshold voltages $Vge_s$ of other transistors that are all identical. Another example could consist of making the measurement directly on the transistor without disturbing the application.

A value of –X volts is fixed, around which slaving is performed. A logical circuit is used to switch the value of the voltage Vp depending on the value of the threshold voltage $Vge_s$ (for given Imin) with respect to the –X reference.

If Vge>–X, then Vp=+2α (in the application example considered α=0.5 V).

If Vge<–X, then Vp=+α.

This simple positive power supply switching slaves the drift of $Vge_s$ around –X and thus ensures that the circuit will remain functional as the dose builds up.

During operation, the IGBT transistor is switched twice; switching to make it conducting or blocked, and amplitude switching of its positive opening voltage providing it with a controlled asymptote of the drift in its threshold voltage $Vge_s$.

Figure 8:
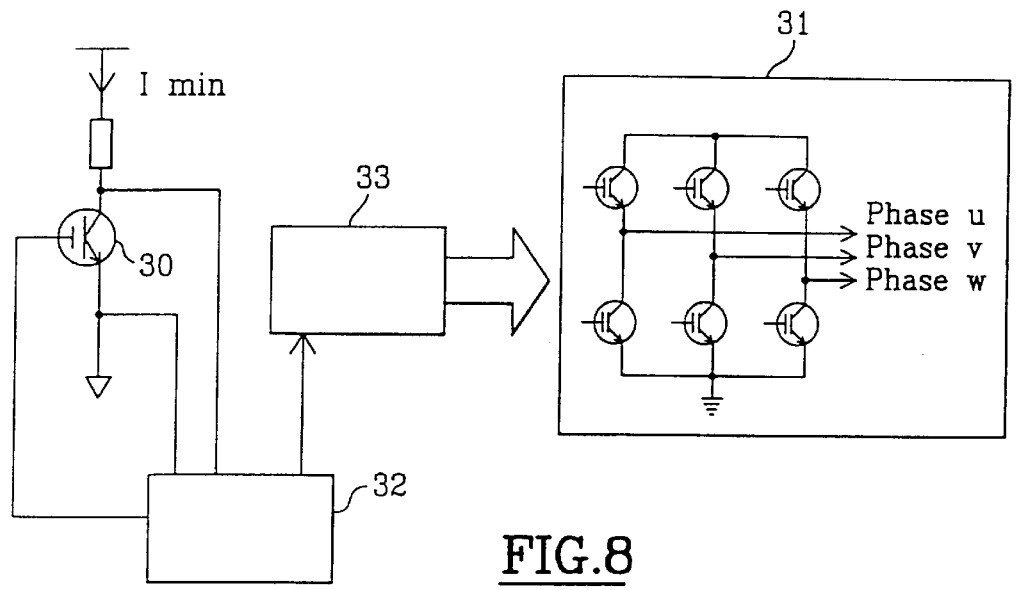
FIG. 8 illustrates the general block diagram of a device embodying the process according to the invention.

A general block diagram implementing this procedure is shown in FIG. 8. This figure shows the test IGBT transistor 30, a circuit 31 comprising six other IGBT transistors (Q1 to Q6), a measurement module 32 also comparing with the voltage –X, and a positive voltage Vp calculation module 33.

Figure 9:
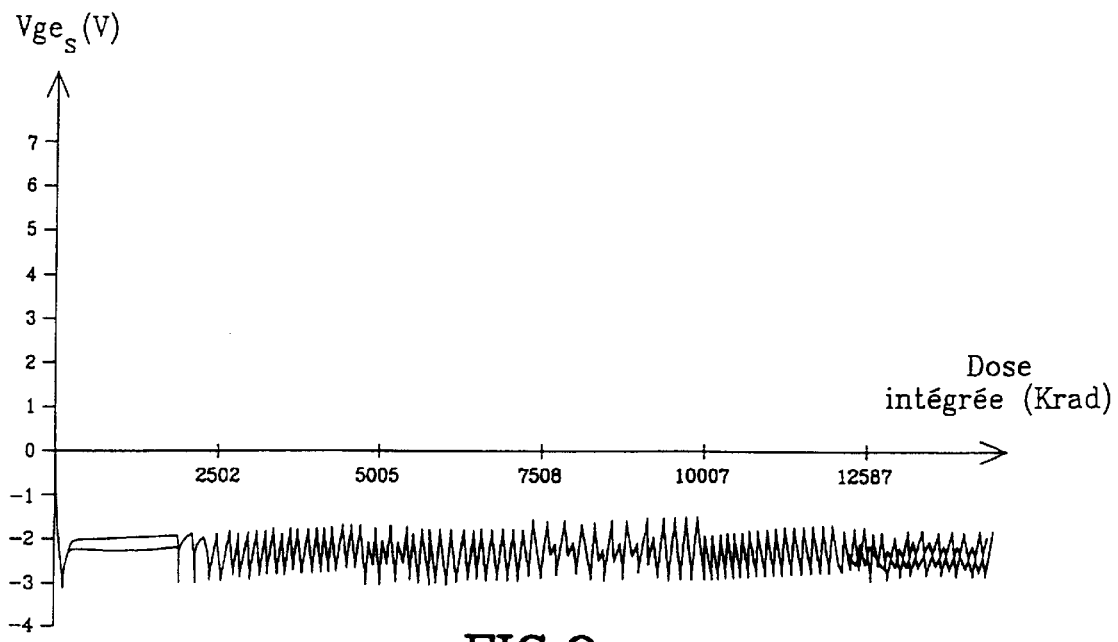
FIG. 9 illustrates the results of switching tests on positive power supplies.

FIG. 9 illustrates the dispersion of the results obtained for an IGBT transistor in a switched gate power supply (+10 V, +5 V, –10 V) for –X=–2.5 volts with a hysteresis of 0.5 volts.

The curve of the drift in the voltage $Vge_s$ as a function of the total dose shows slaving of the drift around the reference considered.

EXAMPLE EMBODIMENT

Figure 10:
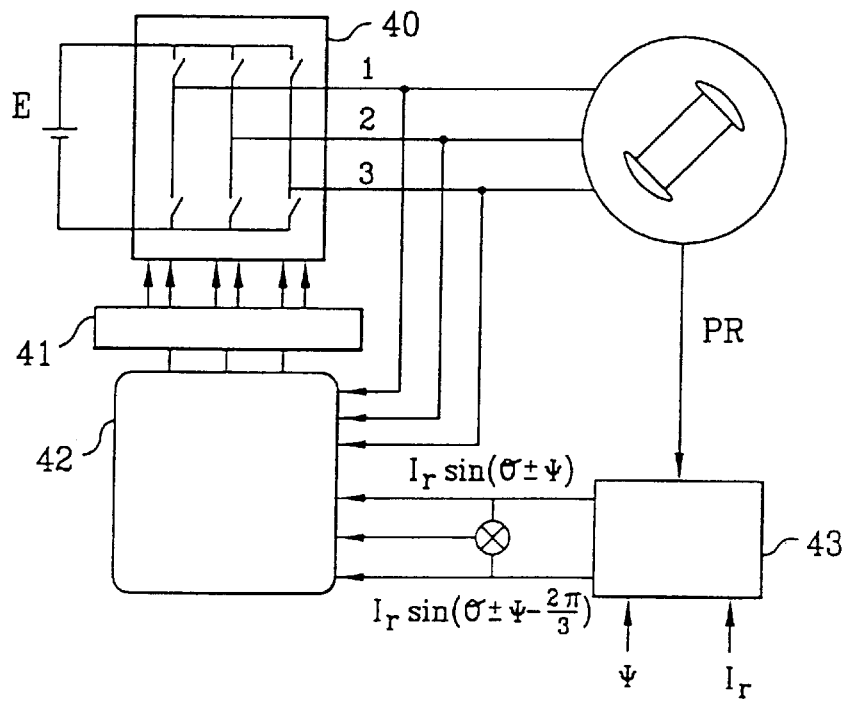
FIG. 10 illustrates a block diagram of an amplifier designed to control a "Brushless" motor for a robot.

The invention can be used to make a power amplifier for a "Brushless" motor (in other words a self controlled synchronous motor), by using a "hardened" three-phase power bridge based on IGBT transistors, particularly in an application for a robot operating in a nuclear environment. This amplifier is capable of outputting a current of 10 A at a voltage of 200 volts. As shown in FIG. 10, it includes a voltage converter 40, the control 41 for this voltage converter using the process according to the invention, a current control module 42 and a reference current generation module 43, PR corresponding to the rotor position.

The amplifier considered is composed of two superposed boards; a power board that contains the power bridge, the test transistor and the associated controls, and a control board that contains power supplies, sequencing and all logic necessary for operation of the amplifier.

Figure 11:
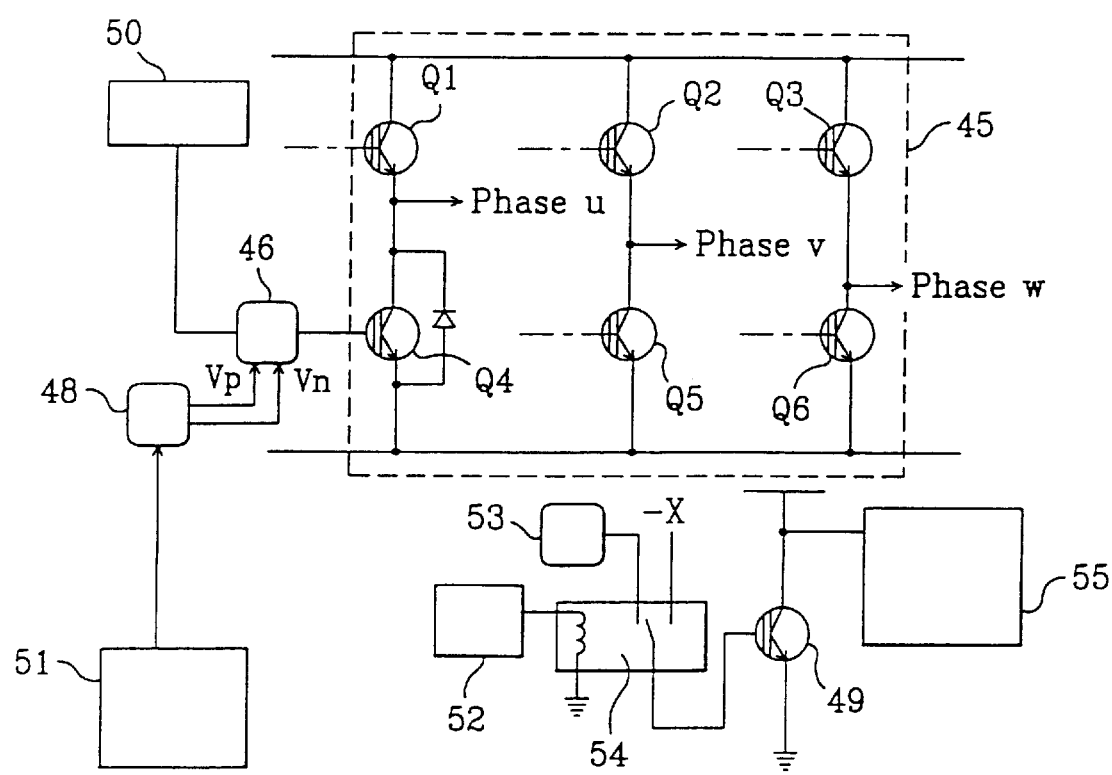
FIG. 11 illustrates the block diagram for the power board for the amplifier illustrated in FIG. 10.

FIG. 11 illustrates the block diagram for the power board. This board contains a power bridge 45 containing six IGBT transistors Q1 to Q6, the "Driver" stages 46, and the respective power supply secondaries 48 that are galvanically insulated. FIG. 11 illustrates the control for a single IGBT transistor, Q4. The other five IGBT transistors are controlled in the same way. This board also contains a test IGBT transistor 49 that is in functionally comparable conditions (particularly the same temperature) to the power bridge transistors 45. This figure also shows a logical control module 50, a galvanicaly insulated power supply module 51 outputting voltages Vp and Vn, a time measurement module 52, a driver stage 53, a measurement relay 54 and a threshold voltage $Vge_s$ measurement module 55.

Figure 12:
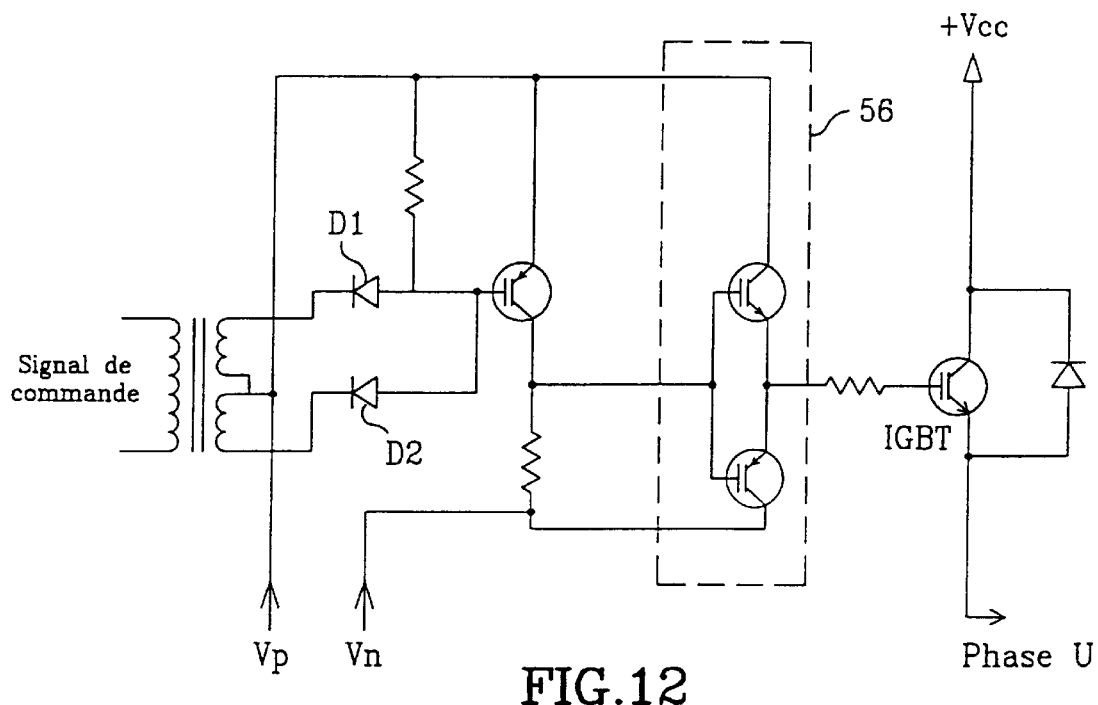
FIG. 12 illustrates a "Driver" module for the power board illustrated in FIG. 11.

The following functions are included on the power board:

the driver (Driver module 46) illustrated on FIG. 12 that directly controls an IGBT transistor from the logical information obtained at the output from module 50. Demodulation is done using two "Schottky" type diodes D1 and D2 mounted as rectifiers with mid-point. The signal thus rectified is input to a "Push-pull" type amplifier 56.

Figure 13:
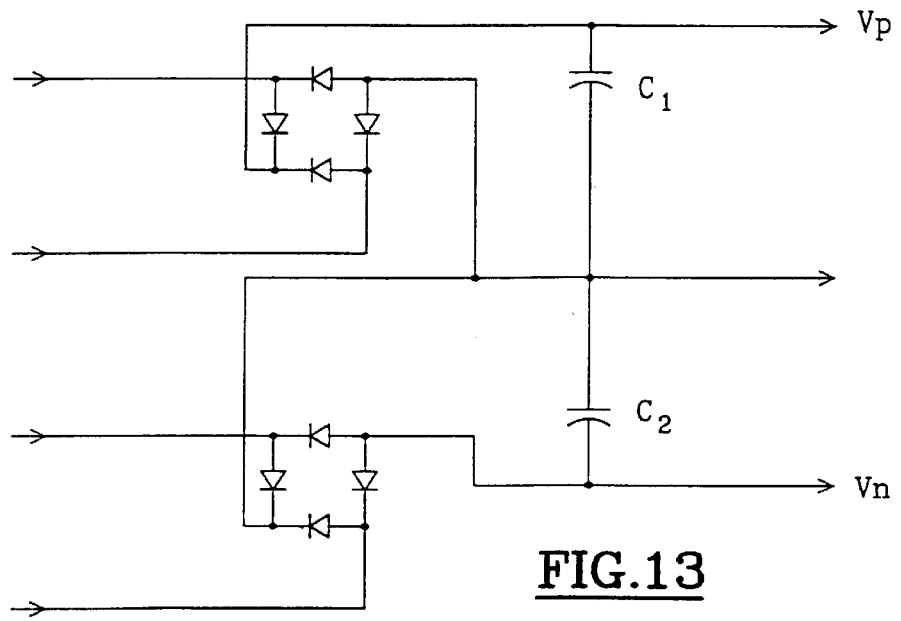
FIG. 13 illustrates another module of the power board illustrated in FIG. 11.

The gate power supply secondary 48 for the IGBT transistor considered as shown in FIG. 13, which is composed firstly of a rectification stage formed by "Schottky" type diodes (for example of type IN5819) to limit the voltage drop, and secondly of filtering formed by two capacitors (C1, C2). Thus two voltages Vp and Vn are obtained that supply power to the power stage.

Figure 14:
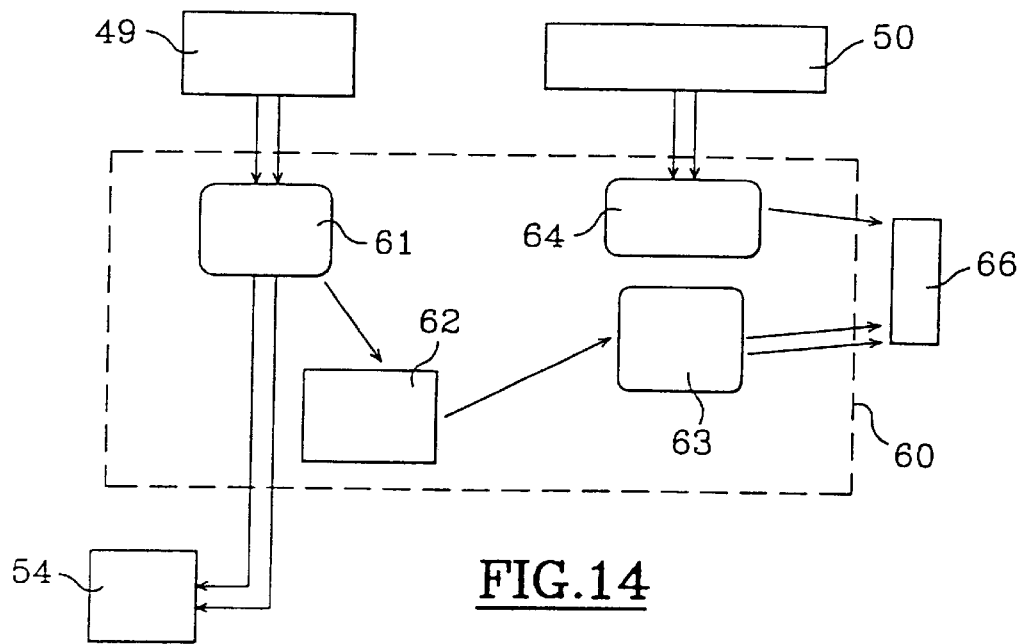
FIG. 14 illustrates the block diagram for the amplifier control board illustrated in FIG. 10.

The control board 60, for which the block diagram is shown in FIG. 14, contains all digital parts of the amplifier considered. In particular, this board contains the entire system hardening logic (synchronization, measurement and processing), modulation of switching orders for the various transistors in the bridge, and switching of IGBT transistor gate power supplies in order to galvanicaly isolate them by transformers. This board comprises a synchronization module 61, a switching relay for the positive power supply Vp 62, a power supply module 63 and a modulation module 64. The synchronization module 61 is connected to the test transistor 49 and to the measurement relay 54. The modulation module 64 and the power supply module are connected to the power board 66, the modulation module also being connected to the control module 50.

Figure 15:
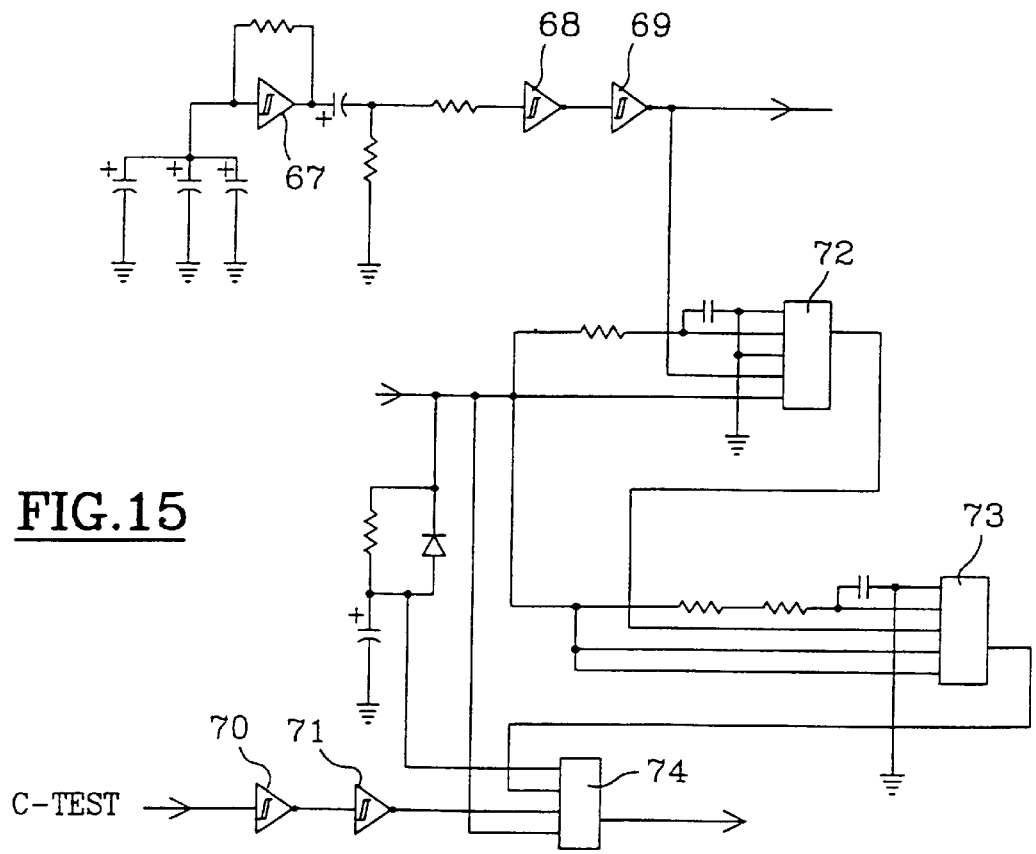
FIG. 15 illustrates a module enabling synchronization and measurement of the threshold signal $Vge_s$ in the control board illustrated in FIG. 14.
Figure 16:
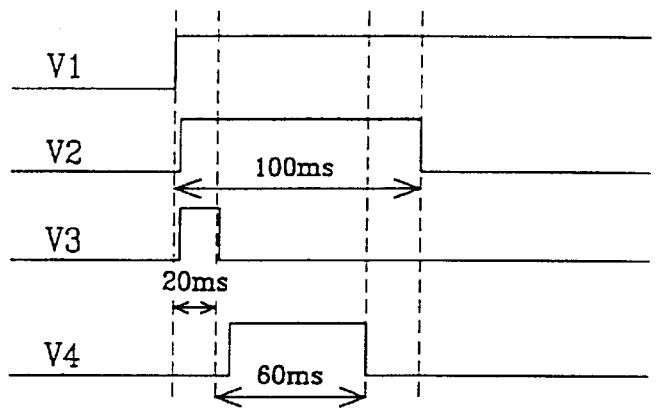
FIG. 16 illustrates this synchronization and this measurement.

The following functions are included on the control board 60:

Synchronization and measurement of the threshold voltage $Vge_s$: module 61 enabling this synchronization and this measurement, which is illustrated in FIG. 15, contains the entire sequencing for the system hardening installed in the amplifier considered. This module also includes NAND-trigger circuits 67, 68, 69, 70 and 71, monostable circuits 72 and 73 type 75LS123, and a flip-flop D 74. The sequencing done is shown in FIG. 16, and is as follows: a 100 ms pulse (V2) is generated every fifteen minutes (V1). The rising front of this pulse triggers the power hoard relay 54. The result is that switching of test IGBT transistor 49 stops, and its gate is polarized negative at –1.75 volts. A delay of 20 ms (V3) is created during the 100 ms pulse to give the relay the time to perform its state change. Then for 60 ms (V4), the voltage Vce$_s$ of the test transistor 49 is measured to determine its state (blocked or saturated). The order may or may not be given to the control relay for the positive power supplies 62 to change over, depending on the observed state. As for the clock (T=15 minutes) the 100 ms pulse is produced using a NAND-trigger gate 67. Delays of 20 ms and 60 ms are created using monostable circuits 72 and 73.

Figure 17:
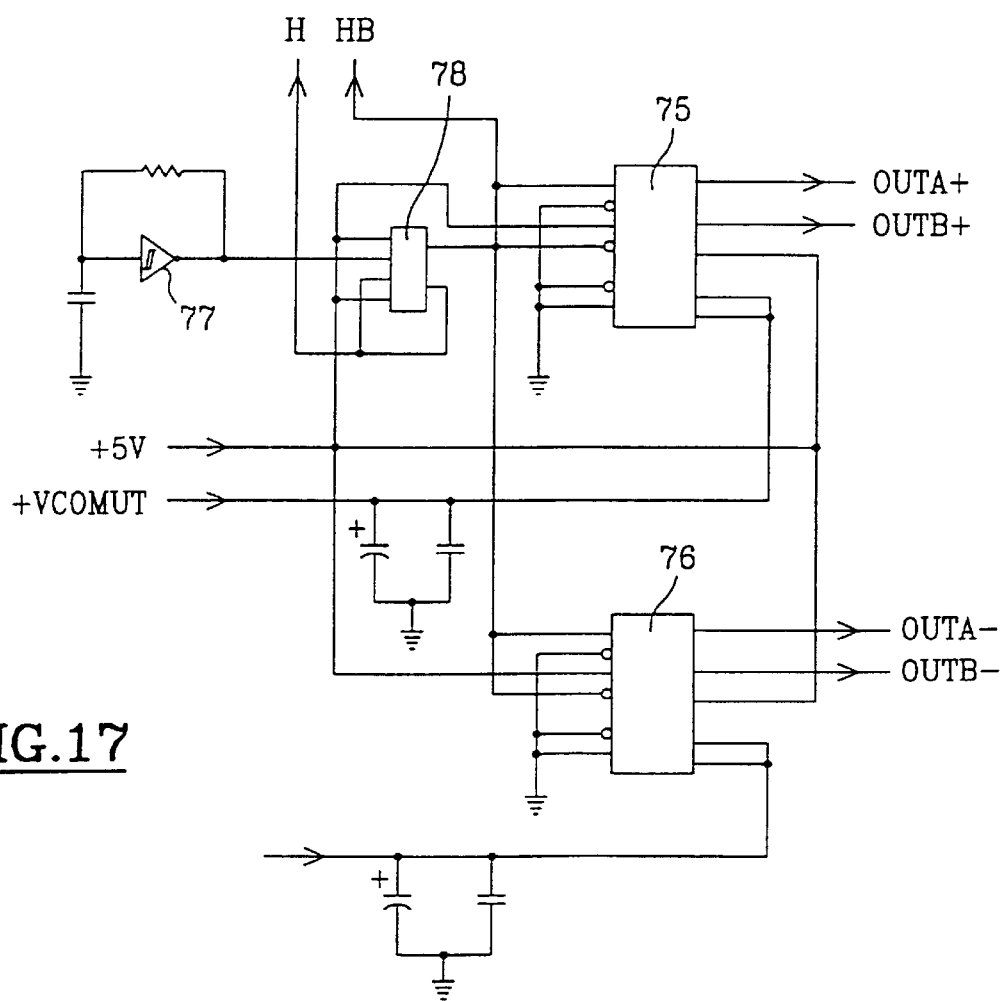
FIG. 17 illustrates the power supply module for the control in the control board illustrated in FIG. 14.

The control power supply; module 63 enabling this power supply, which is shown in FIG. 17, generates primary switching of the positive and negative power supplies for IGBT transistor gates in the power bridge. This switching, done using two integrated power circuits 75 and 76, for example of type unitrode UC3707, is input to the power supply transformers. These transformers are powered by a voltage that is switched by the power supply switching relay 62. The modulation clock (f=595 Hz) is made using a Schmitt trigger oscillator 77 and a trigger D 78 mounted as a divider by 2. The modulation clock has a cyclic ratio of 50% to avoid DC components in the transformer.

Figure 18:
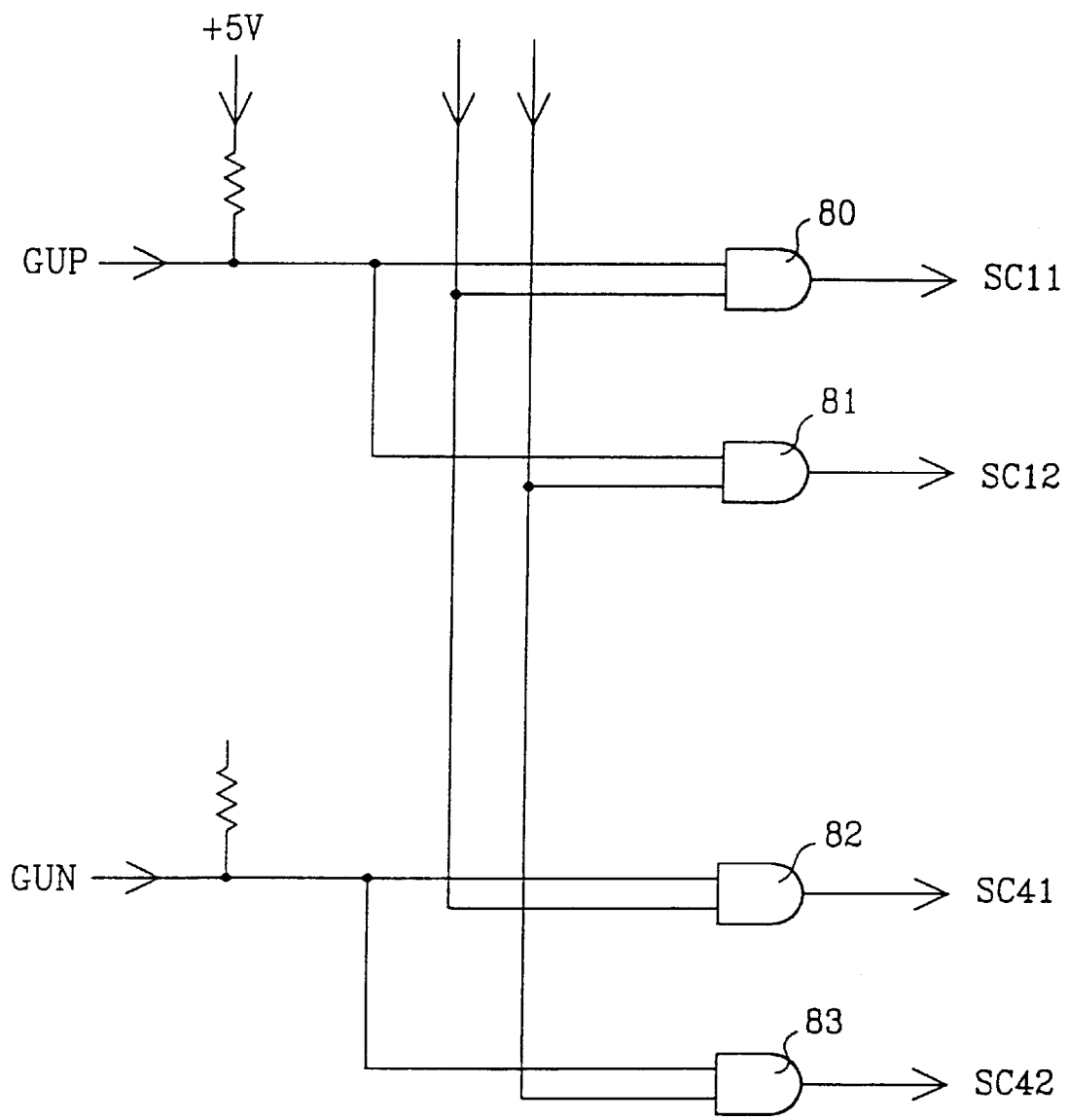
FIG. 18 illustrates the module used for modulation in the control board illustrated in FIG. 14.

Modulation: module 64 recovering the clock from the control power supply module shown in FIG. 18, has the sole function of modulating the control of the IGBT transistors in the power bridge so as to power the control transformers. Modulation is done by logical AND gates 80, 81, 82, 83 to which the transistor control signal and the clock output from the Schmitt trigger 77 are input.

We claim:

1. Process for controlling at least one IGBT type transistor enabling its operation under irradiation, characterized in that the value of the threshold value Vge$_s$ of the gate-emitter voltage of a first IGBT transistor (30) under irradiation s measured, and the voltage applied between the gate and the emitter of at least one second IGBT transistor (Q1–Q6) under irradiation is varied during operation, such that the threshold voltage Vge$_s$ of the at least one second IGBT transistor is slaved to a set value despite the drift caused by irradiation.

2. Process according to claim 1, in which the first transistor (30) is a test IGBT transistor.

3. Process according to claim 1, in which at least one of two power supply sources (positive Vp and negative Vn) applied between the gate and emitter of the at least one second IGBT transistor, is modulated.

4. Process according to claim 3, in which the at least one second IGBT transistor is subjected to double switching; conventional switching in blocked-unblocked and amplitude switching of the threshold voltage Vge for implementation of slaving.

5. Process according to claim 4, in which the applied positive voltage Vp is switched as a function of the value of the threshold voltage Vge$_s$ of the first transistor (30) compared with a reference –X as follows, where α is a determined voltage value:

If Vge$_s$>–X then Vp=+2α

If Vge$_s$<–X then Vp=+α so that a controlled asymptote can be obtained of its threshold voltage Vge$_s$.

6. Process according to claim 5, in which α=5 volts.

* * * * *